Nov. 15, 1960 R. LOPEZ 2,960,285
AIRCRAFT WING WITH CONTROL ELEMENTS AT WING TIPS
Filed Feb. 2, 1956 4 Sheets-Sheet 1

INVENTOR.
Robert Lopez
BY Emery, Whittemore
Sandoe & Dix
ATTORNEYS

United States Patent Office 2,960,285
Patented Nov. 15, 1960

2,960,285

AIRCRAFT WING WITH CONTROL ELEMENTS AT WING TIPS

Robert Lopez, Sunset Park, Williamsport, Pa.

Filed Feb. 2, 1956, Ser. No. 563,107

15 Claims. (Cl. 244—82)

This invention relates to the construction of aircraft wings and more especially to aircraft wings having control surfaces at the wing tips.

These control surfaces at the wing tips are airfoil sections which serve in effect as extensions of the wings, but the control surfaces are pivoted to swing about spanwise pivot axis to effect various improvements in the operation of the wing.

One object of the invention is to improve the airplane efficiency by increasing the equivalent aspect ratio. This efficiency increase is obtained by a regenerative action of the wing tip control surfaces which affect the trailing vortices found at the usual wing tips and which produce downwash and resulting drag.

Another object of the invention is to obtain improved longitudinal and lateral control of an aircraft by means of control surfaces located at the wing tips and beyond the rigid wing structure. These control surfaces, because of their free swinging movement about spanwise extending pivots, are referred to herein as "flippers."

Another object of the invention is to obtain more effective lateral and longitudinal stability by flipper action which produces an effect comparable to that of an auto pilot, the flipper motion being independent of the operator of the airplane.

Other objects are to prevent stalling, to decrease the overall drag coefficient of the airplane, to obtain favorable yawing moments due to roll, and to increase the overall lift as a result of the more favorable location of the center of gravity and the regenerative effect of the flippers in recapturing energy that would otherwise be lost at the wing tips.

Another object of the invention is to provide control means having a stick load variation providing the operator with a feel of the control even when using an irreversible control system.

Other objects, features and advantages of the invention will appear or be pointed out as the description proceeds.

In the drawing, forming a part hereof, in which like reference characters indicate corresponding parts in all the views.

Aero dynamic theory shows that if a wing of infinite span is subjected to a flow of perfect fluid, that is, a fluid that is incompressible and that has zero viscosity, the drag forces are zero. With a finite wing, however, a downwash is produced at the wing tips with resulting drag. This is caused by trailing vortices that appear at the wing tips where the high pressure below and the low pressure above the wing create a lateral flow around the tips.

Figures 1, 2:
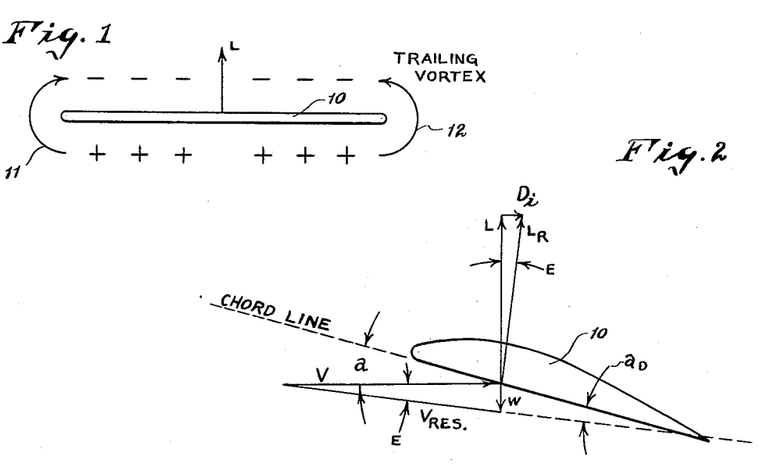
Figure 1 is a diagram illustrating the way in which energy and lift are lost by flow at the wing tips of an aircraft.
Figure 2 is a view of an aircraft wing looking spanwise and with the forces thereon illustrated diagrammatically to show the loss resulting from drag.

The consequence is that a downwash velocity is created, the distribution of which affects the lift along the span. Figure 1 illustrates a wing 10 with higher pressure under the wing indicated by plus signs and a reduced pressure above the wing indicated by minus signs. Figure 1 is a view of the wing from the front and the direction of lift caused by the high pressure under the wing, and the reduced pressure above the wing, is indicated by the arrow marked with the legend "L."

At the wing tips, the high pressure under the wing causes a flow around the tips to the region of reduced pressure above the wing 10. This flow of air is indicated by the arrows 11 and 12. This air flow produces trailing vortices at the wing tips and results in a downward velocity which decreases the lift of the span.

Figure 2 illustrates the manner in which the forces on the air foil are affected by the downwash. The wing 10 is immersed in an air stream of velocity "V" and at an angle of attack "a." As a result of the downwash, indicated in direction and force by the vector "W," the resultant velocity "V$res$" is inclined at an angle "E" so that the air foil or wing 10 experiences an effective angle of attack "aD." It is assumed that the fluid is a perfect one so that no tangential forces occur. Therefore the resultant lift "LR" will be perpendicular to the effective angle of attack aD, and a force component "Di" is induced opposing the motion of the air foil.

This force component Di is called the "induced drag," and its magnitude is affected by the downwash. The greater the aspect ratio of the wing, that is, the ratio of the span square to the area of the air foil, the lower the induced drag for a given value of lift.

It is apparent, therefore, that the wing having the greater span will be the more efficient, but a large span on an airplane introduces structural problems.

With the present invention the flippers produce the efficiency equivalent to a large span by utilizing the kinetic energy available in the trailing vortices on a wing of small span. Thus the invention introduces independent surfaces at each tip of the wing which provide the means for regeneration. The control surfaces provided by the flippers can have a plan form following the shape of the adjacent wing, or any other suitable shape to obtain the requirements of the flippers.

When the flippers are at the same angle of attack as that of the wing, their effect is simply to change the planform of the basic wing, that is, the rigid wing to which they are connected. When a flipper is allowed to rotate about its lateral axis so as to change its angle of attack in relation to the wing, the flipper is then subjected to a flow of air which will be similar to that obtained at the tip of a finite wing. This flow consists of a rotary as well as a translatory motion and varies in character at different distances from the wing tip. The complexity of this flow, in particular when affected by the flipper, is then very difficult to submit to mathematical treatment. Wind tunnel tests have demonstrated, however, that the effect of the flippers is to increase the lift and reduce the drag of the wing with which they are connected.

Figure 3:
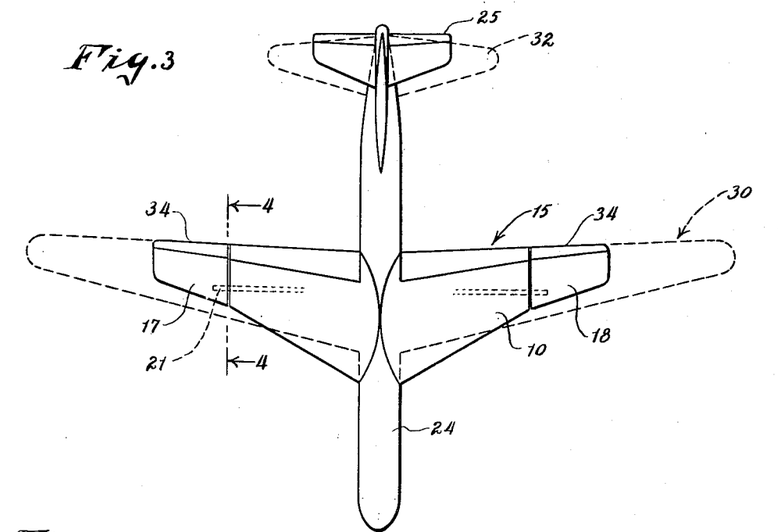
Figure 3 is a view showing the top plan of an airplane embodying this invention, and with a superimposed outline, in dotted lines, showing the size of an airplane of equivalent lift made without the present invention.

Figure 3 shows an aircraft 15 having a wing 10 and flippers 17 and 18 pivotically connected to the tips of the wing 10 for movement about pivot shafts 21 and 22, respectively. The aircraft 15 has a fuselage 24 and tail 25.

Figure 3 shows the outline of another aircraft 30 superimposed on the outline of the aircraft 15 and constructed in the conventional manner without the flippers of this invention. The aircraft 30 has a tail 32. This aircraft 30 has the same lift as the aircraft 15 and the difference in the span and in the wing and tail areas show the outstanding advantages of the aircraft 15 equipped with the flippers of this invention.

In the preferred construction stability and control, both longitudinally and laterally, is achieved by having the flippers 17 and 18 freely pivoted so that they can rotate about their pivot shafts 21 and 22, respectively, as free floating surfaces. For perfect response, automatic operating mechanism is required. In order to better understand the operation of the flipper, it may be considered as an isolated surface, as viewed in Figure 4.

Figure 4:
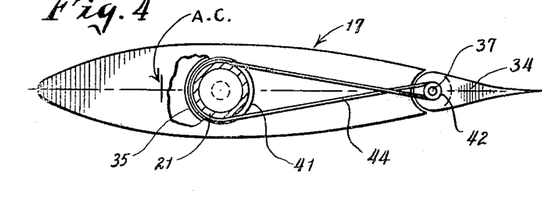
Figure 4 is an enlarged, sectional view taken on the line 4—4 of Figure 3.

Figure 4 shows the root chord of the flipper 17, that is, the end which is adjacent to the wing tip. The pivot connection of the flipper to the wing is located behind the aerodynamic center of the flipper 17. The aerodynamic center, the point about which the pitching moments are constant, is indicated by the legend "ac." An additional control surface element, similar to the elevator of a conventional horizontal tail, is hinged to the forward portion of the flipper 17 at the trailing end of the forward portion. This additional control surface element will be referred to as a "flap" or "elevon," and it is indicated in the drawing by the reference character 34. The elevon 34 serves the dual purpose of an elevator for longitudinal control and an aileron for lateral control.

Figures 5, 6:
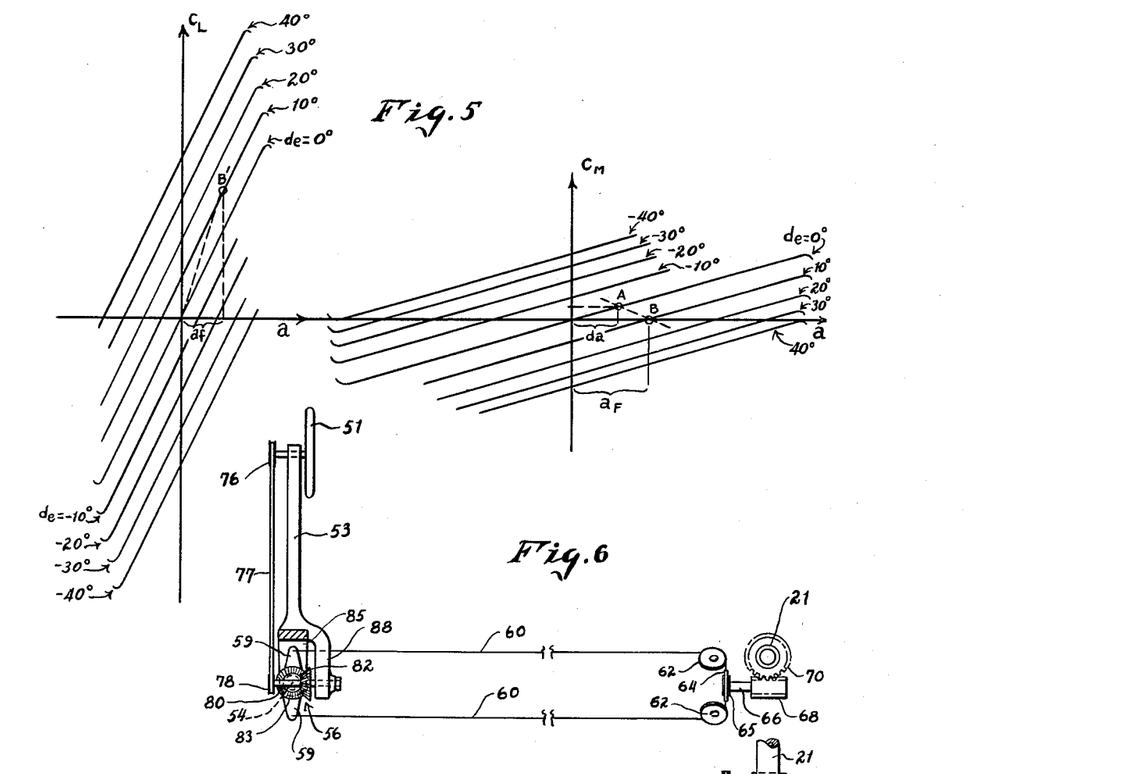
Figure 5 is a graph illustrating the operation of the invention.
Figures 6 and 7 are elevation and plans views, respectively, illustrating diagrammatically the mechanism for operating the control surfaces.

If the flipper 17 is subjected to an air flow and rotated about its pivot axis to various angles of attack "$a$," a graph of aerodynamic coefficients representing the forces and moments is obtained as shown in Figure 5. In this figure the curves for CL and CM represent changes in dimensionless coefficients of lift and pitching moments, respectively, at different angles of attack "$a$" and at various angles of elevon deflection relative to the flipper. The angle of elevon deflection relative to the flipper, is indicated by the legend "$de$." It should be noted that the slope of the pitching moment curve is unstable, that is as the angle of attack increases, the pitching moment increases positively.

Referring again to Figure 4, the flipper 17 rotates freely about the shaft 21 on ball bearings 35, and the shaft 21 being held motionless by its connection to elements carried by the fixed structure of the wing. The elevon 34 is connected to the trailing end of the forward portion of the flipper 17 by a hinged connection which will be described in connection with Figure 11. For the present it is sufficient to understand that the elevon 34 swings about an axis 37 to change its angular relation with respect to the forward portion of the flipper 17.

In order to make the elevon 34 move into different angular positions, as the flipper changes its angle of attack, there is a pulley 41 attached to the shaft 21 and concentric with the pivot connection of the flipper to the wing. There is another pulley 42 attached to the elevon 34 concentric with the pivot axis 37 of the elevon. A crossed belt 44 passes around the pulleys 41 and 42. This belt causes the elevon pulley 42 to turn as the elevon moves angularly about the axis of the shaft 21 with the shaft stationary. When the shaft 21 is rotated, by pilot-operated controls which will be described hereinafter, the pulley 41 rotates as a unit with the shaft, and the belt 44 transmits the rotation to the elevon pulley 42.

The pulleys 41 and 42 are preferably of different diameter, and in the construction illustrated the pulley 41 has a diameter substantially equal to four times the diameter of the elevon pulley 42.

Because of the crossed belt 44, the positive movement of the flipper 17, nose up about its pivot axis results in a positive movement of the elevon 34 about its pivot axis 37. The ratio of these angular movements is proportional to the diameters of the pulleys 41 and 42. For example, if the flipper 17 rotates about its pivot connection through a counterclockwise angle of 3°, then the elevon 34 will rotate through a counterclockwise angle of 12°.

Referring again to Figure 5, with the inter-connection between the flipper and elevon in mind, it will be assumed first that the flipper is trimmed, that is, in equilibrium with its angle of attack equal to zero and with the angle of the elevon to the flipper also equal to zero. Thus "$a$" equals zero degrees, and "$de$" equal zero degrees, in an airstream at some velocity. If an increment of "$a$" occurs, due to gust, the magnitude of this increment may be indicated "$Da$." Assuming that this increment takes place instantaneously, the flipper will experience a pitching moment ("CM") corresponding to the point A in Figure 5, and this will cause the flipper to rotate so that the nose moves upwardly.

This upward movement of the nose of the flipper causes an angular movement of the elevon through an angle dependent upon the ratio of the diameters of the pulleys of the belted connection between the elevon and the shaft 21. This movement of the elevon brings the flipper to a new position of trim at some point such as the point B in Figure 5.

Referring next to the lift ("CL") portion of Figure 5, it will be seen that the lift increases from 0 to the level of a point B', the magnitude of this increase in "CL" depends upon the location of the pivot connection of the flipper to the wing and upon the ratio of the flipper movement to the elevon movement, and the ratio of the elevon chord and span to the flipper chord and span. It will be evident that a fairly large latitude of requirement can be met depending upon the amount of stability desired for a particular airplane design.

It will be evident also that the maximum gains in lift will be obtained for an airplane center of gravity located rearward of the aerodynamic center so that the resultant pitching moment curve will have a positive slope for the airplane without flippers. This means that, as "$a$" increases, the pitching moment increases in a positive direction; and in order for the airplane to be stable (that is, the slope of the pitching moments to be negative) the flipper contribution has to be a positive increment of lift. Under these conditions, the positive lift obtained with the flipper is added to the wing lift instead of substracted as in the case of stability control surfaces of most conventional airplanes.

An important characteristic of a three dimensional flapped air foil is that as the flap deflection is increased beyond about 15°, the successive increments of the pitching moments decrease. For the free floating flipper, this means that as the angle of attack of the airplane is increased, the flipper has to rotate through a greater angle to trim itself. The result is that not only is the angle higher, but so is the camber and consequently the lift. The effect on the stability is that the longitudinal stability index $dCM/dCL$ increases from a conventional value at low angles of attack to six or seven times that available in present day airplanes at high angles of attack. If the air foil configuration is such that the maximum lift is attained at a relatively low flipper elevon deflection, then by limiting the elevon deflection to its maximum for trim in the flight range, stall is made impossible both for the airplane and for the flipper.

Because of the fact that the aerodynamic forces on the flippers depend upon the flow at the wing tip, any change in wing angle of attack, and therefore in lift, results in different values of lift and drag for equal values of flipper deflection. The main effect actually is to shift the zero angle of attack to the left in Figure 5, to increase the lift by a small amount and to decrease the flipper drag considerably. This last effect has been evidenced in wind tunnel tests and is probably due to the advantageous interference effects.

The fact that the zero lift angle of attack is shifted to the left as the wing lift is increased indicates that the angular displacement of the flipper required for stability and control will be decreased. This is desirable from a standpoint of dynamic stability.

The lateral stability is obtained very much in the same manner as is the longitudinal stability. In the latter case, a positive change in angle of attack results in a clockwise rotation of the flippers with the accompanying increase in negative pitching moments about the center of gravity. A lateral rotation of the airplane induces changes in the angle of attack as a function of angular velocity. For example, assuming that the airplane rolls to the right; the right flipper experiences an increase in angle of attack while the left one decreases its angle of attack. The result is that a moment about the longitudinal axis opposing the roll takes place. This moment will be of a greater magnitude than that produced by conventional aircraft because the flipper will both rotate and increase its camber.

Figures 7, 8:
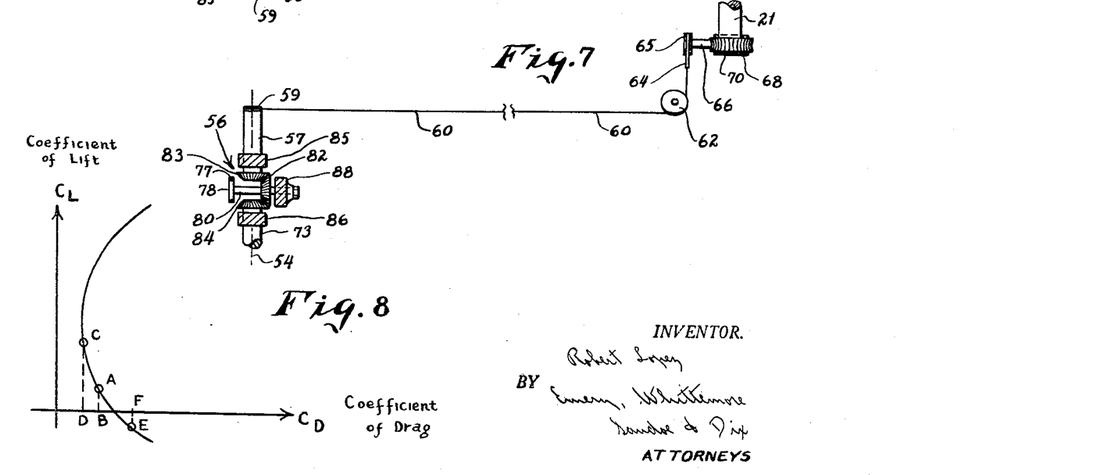
Figure 8 is another graph illustrating the principle of operation of the invention.

Longitudinal and lateral control is available by the mechanism shown diagrammatically in Figures 6 and 7. This mechanism, and particularly the elevation view shown in Figure 6, should be considered in connection with Figure 4.

Referring further to Figure 6, the elevon is operated by turning the shaft 21, as previously explained. The operator rotates the shaft 21 by means of a wheel 51, and the mechanism is constructed so that the wheel 51 can operate both of the elevons of the aircraft together in the same direction or simultaneously in opposite directions. When the wheel 51 is pulled back (toward the right in Figure 6), the wheel support 53 moves clockwise about an axis 54 of a gear assembly 56. The lower end of the wheel support 53 has a branched construction which provides bearings on which the wheel support moves, as will be explained hereinafter. For the present it is sufficient to understand that the counterclockwise movement of this gear assembly 56, about the axis 54, imparts similar movement to a torque tube 57 which is connected at one end with a gear of the gear assembly 55. At the other end of the torque tube 57, there are horns 59, best shown in Figure 6, and these horns 59 are connected to cables 60. The cables 60 pass around pulleys 62 and have their ends connected to a short length of chain 64 which passes over a sprocket 65 secured to one end of a shaft 66. This shaft 66 rotates a worm 68 which meshes with a worm wheel 70 secured to the shaft 21.

The rotary movement imparted to the tube 57 causes the upper and lower horns 59 to move the cables 60 in opposite directions so that the chain 64 rotates the sprocket 65, and through the shaft 66, worm 68 and worm wheel 70 causes rotation of the shaft 21 and consequent deflection of the elevon.

This rotation of the tube 57 by tilting of the entire gear assembly 56, also rotates another tube 73 which is identical with the tube 57 and which is connected with the elevon on the other side of the aircraft by mechanism similar to that shown in Figures 6 and 7. Thus tilting of the gear assembly 56, by forward and rearward movement of the wheel 51, causes the tubes 57 and 73 to rotate in the same direction as one another, and results in operation of the elevons together and in the same direction.

From the construction illustrated it will be apparent that clockwise rotation of the horns 59 produces rotation of the worm 68, in a direction to impart counterclockwise rotation of the worm wheel 70 and shaft 21. Because of the crossed belt 44, shown in Figure 4, the counterclockwise rotation of the shaft 21 causes a clockwise rotation of the elevon 34 decreasing the lift and producing a nose up movement of the airplane. Pushing the wheel 51 forward in Figure 6 has the opposite effect and produces a nose down movement of the aircraft.

There is a sprocket 76 on the shaft with the wheel 51, and a chain 77 passes around the sprocket 76 and also around another sprocket 78 of the gear assembly 56. This sprocket 78 is secured to a shaft 80 which turns a bevel gear 82. This bevel gear 82 meshes with other bevel gears 83 and 84 secured to the tubes 57 and 73, respectively.

Rotation of the wheel 51 rotates the sprocket 76, and through the chain 77 imparts rotation to the sprocket 78, shaft 80 and bevel gear 82. This rotation of the bevel gear 82 turns the other bevel gears 83 and 84 in opposite directions and results in a simultaneous operation of the elevons, but in opposite directions.

This operation of the elevons in opposite directions obtains lateral control of the aircraft. It is necessary, therefore, to provide enough elevon deflection for lateral control above and beyond that needed for longitudinal control.

The support or control column 53 has its lower end shaped so that branches of the column extend across the top and down the sides of the gear assembly 56. These branches of the column 53, shown in Figure 7, include a portion 85 which fits around the torque tube 57 and a corresponding portion 86, on the other side of the gear assembly, which fits the torque tube 73. Thus the torque tubes 57 and 73 provide bearings on which the bottom portions 85 and 86 of the column 53 rotate about these aligned tubes.

The lower end of the support or column 53 has another branch portion 88 which provides a bearing for the shaft 80 to which the gear 82 is secured. When the column 53 is tilted forwardly or rearwardly of the axis of the tubes 57 and 73, it is the portion 88 of the column that moves the shaft 80 and gear 82 about the axis of the tubes 57 and 73 to turn the gear assembly 53 as a unit. It will be understood that this illustration of the operating mechanism has been made diagrammatic in order to simplify the drawing and to facilitate the understanding of the invention.

In the majority of conventional airplanes, applying lateral control produces both roll and an adverse yawing moment. The unsymmetrical drag forces associated with the unsymmetrical lift distribution furnishes a force component tending to lift the nose of the airplane. For example, to roll to the right, the lift on the right wing is decreased by up aileron deflection, while it is increased on the left wing by down aileron deflection. The down wing then decreases in drag and the up wing experiences an increase in drag. The result is that the nose of the airplane tends to rotate to the left, opposing the desired direction of turn.

By locating the flippers of this invention at the wing tips, the opposite effect is produced as illustrated in Figure 8.

Figure 8 is a polar graph with the coefficient of lift (CL) plotted against the drag coefficient (CD) for the flipper in the presence of the wing. A roll to the right is produced by increasing the lift of the left elevon and decreasing that of the right one as mentioned above. For the illustration in the graph it is assumed that before deflecting of the elevons, they were trimmed at a coefficient of lift corresponding to the point A in the graph. Reducing the lift on the right elevon, for example, to the point E, results in a drag increase to the point F, and increasing the left elevon lift to the point C results in a decrease in drag to the point D. Therefore, a yawing moment helping the right turn is produced. An additional advantage which may be noted here is that the use of the flippers for control leaves the full span of the fixed wing available for inclusion of high lift devices.

From the foregoing description it will be clear that in accelerating an airplane equipped with the flippers of this invention, in a positive direction (nose up), the elevons are deflected down. The result of this deflection is to rotate the flipper nose down so that the problem of transmitting stick loads to the pilot in a conventional and accepted fashion is quite difficult, particularly because of the fact that the instant the elevon is rotated, the flipper, in the process of seeking its new position of equilibrium, will oscillate to some extent and thus provide erratic load variations to the pilot. It is for this reason that the control system used with this invention is irreversible, meaning that although the control of the wheel does move the elevons either together or differentially, the worm and worm wheel combination prevents oscillations of the flipper from being felt by the operator. It is desirable, therefore, to provide the pilot with some other means for feeling control loads and aircraft accelerations in accordance with accepted standards.

Figures 9, 10, 12, 13:
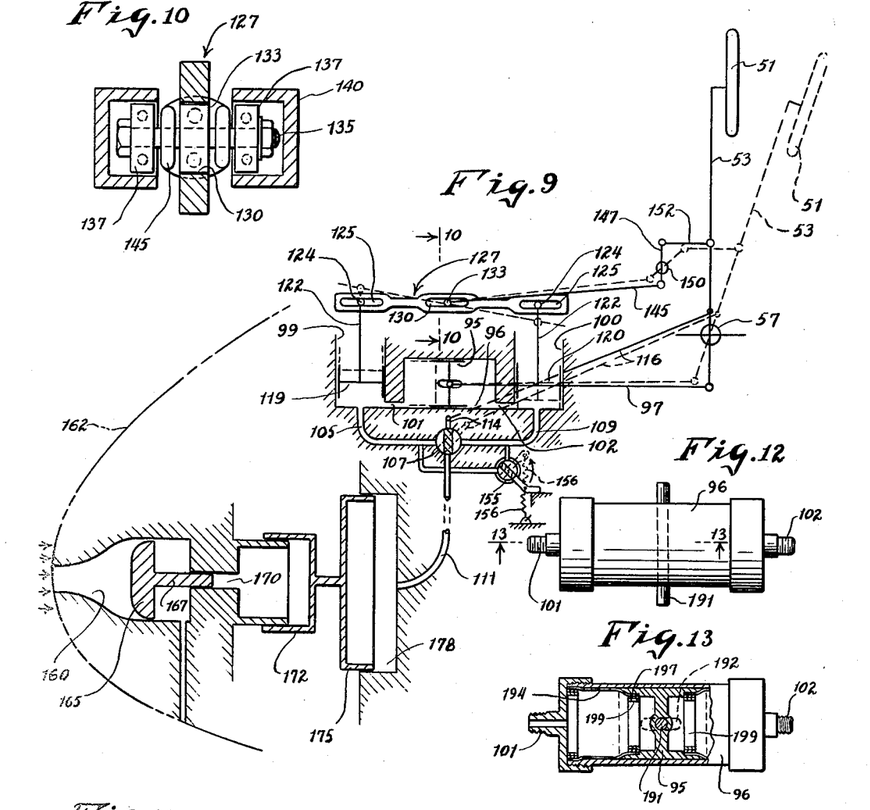
Figure 9 is a diagrammatic view showing hydraulic mechanism for providing a "feel" or resistance, for the operator of the controls, which is dependent upon the displacement of the controls and the flight of the aircraft.
Figure 10 is an enlarged sectional view taken on the line 10—10 of Figure 9.
Figure 12 is a top plan view of a cylinder of the feel mechanism.
Figure 13 is a side view, mostly broken away and in section along the line 13—13 of Figure 12.

Figure 9 shows a control system which gives the pilot the feel required for satisfactory operation of an aircraft fitted with the irreversible control mechanism shown in Figures 6 and 7. The wheel 51 is carried at the upper end of the support or control column 53 which rocks about the axis of the tube 57. When the pilot pulls back on the wheel 51, either to climb or to trim at a lower speed, the control column 53 rocks in a clockwise direction as illustrated in dotted lines in Figure 9. This displaces a piston 95 to the left in a cylinder 96 the motion being imparted to the piston by a link 97 connecting the piston with the lower end of the support or column 53.

At its opposite ends, the cylinder 96 communicates with side cylinders 99 and 100 through connecting passages 101 and 102, respectively. The cylinder 99 is connected by a passage 105 to an outlet port of a valve 107, and the cylinder 100 is connected by a passage 109 to another outlet port of the same valve 107. Air is supplied to the valve 107 through an inlet passage 111.

The valve 107 has an operating lever 114 connected to the column 53 by link 116 which actuates the valve as follows: When the valve 107 is in neutral position it shuts off the flow of air from the inlet 111 to both of the passages 105 and 109. When the control column 53 is moved forward (counterclockwise), the link 116 operates the valve 107 to admit air from the inlet 111 through the passage 105 to the cylinder 99. When the control column 53 is pulled back, into the dotted line position shown in Figure 9, the link 116 moves the operating lever 114 into the dotted line position and this puts the valve 107 in position to admit air from the inlet 111 through the passage 109 to the cylinder 100. The air pressure in the inlet 111 varies as a function of the air speed of the craft, as will be explained more fully hereinafter.

In the cylinder 99 there is a piston 119, and in the cylinder 100 there is a similar piston 120. Each of the pistons 119 and 120 has a piston rod 122 extending upwardly to a roller 124 located in a slot 125 of a balancing arm 127. The piston rods 122 extend vertically at all times through suitable guide means and the rollers 124 are carried by the upper ends of the piston rods 122 and determine the movement of the pistons 119 and 120 in their respective cylinders depending upon the position of the balancing arm 127. This balancing arm 127 is provided with a center slot 130, and the arm is supported by a roller 133 which extends through the slot 130.

Figure 10 is a sectional view showing the manner in which the balancing arm 127 is supported. The roller 133 is preferably a ball bearing roller on a shaft 135. This shaft has ball bearing rollers 137 at its opposite ends; and the ball bearing rollers 137 are confined in channels or guide rails 140 which prevent vertical movement of the rollers 137 and thereby limit the movement of the shaft 135 and the roller 134 to horizontal displacements.

The guide rails 140 also prevent transverse displacement of the shaft 135, that is, displacement in the direction of the length of the shaft 135. The inner races of the ball bearing rollers 133 and 137 are secured to the shaft 135, preferably by providing a press fit, and the limitation on the endwise displacement of shaft 135 by the guide rails 140 serves, therefore, to prevent axial displacement of the rollers 133 and 137.

The shaft 135, and the roller 133, are displaced along the length of the slot 130 and guide rails 140 by a link 145 through one end of which extends the shaft 135. The other end of the link 145 is connected with the lower end of a lever 147 (Figure 9) which rocks about a fulcrum 150. The upper end of this lever 147 is connected to a control column 53, above the pivot axis of the shaft 57, by a link 152.

The feel system operates as follows:

When the control column 53 is pulled back with the airplane flying at a given velocity, the link 116 moves the valve 107 into position to admit air from the inlet 111 through the passage 109 to the cylinder 100. The valve 107 shuts off the flow of air from the inlet 111 through the passage 109 to the cylinder 99. The link 97 moves the piston 95 toward the left in cylinder 96 and compresses the air in the left-hand end of the cylinder 96 and in the cylinder 99 below the piston 119.

This movement of the control column 53 also actuates the link 152, lever 147 and link 145 to move the roller 133 toward the left hand end of the balancing arm 127. This shifts the fulcrum of the balancing arm 127 toward the left by an amount which makes the moment resulting from the pressure under the piston 119, about roller 133, the same as the moment resulting from the pressure under the piston 120 at the other end of the balancing arm 127. This causes the balancing arm 127 to remain horizontal, and the load on the piston 95 is transmitted to the control column and consequently to the pilot.

Pulling the control column 53 back causes the airplane to increase its angle of attack and eventually slow down to an air speed corresponding to the new trim condition as dictated by the control column position. As the airplane slows down with the control column 53 still in its deflected position, the pressure in the inlet 111, which pressure is dependent upon the air speed, decreases with the result that the moment of the pressure at the right-hand end of the balancing arm 127 does not balance any more with the moment of pressure at the other end of the balancing arm. The balancing arm will therefore seek a new position as a consequence of the superior pressure in the cylinder 99 until the moments about the fulcrum roller 133 are equal. During the process, the piston 119 moves upwardly, thus decreasing the pressure on the piston 95 and the pilot feels a decrease in the control load.

The description of the feel system thus far has been on the assumption that the airplane is flying at a given velocity. The same control force will be felt, however, by the pilot for the same control column deflections starting from zero speed to the same air speed previously assumed. When the airplane is preparing to take off, the pilot holds the control column 53 in the same angular position as previously and as shown in dotted lines in Figure 9. Initially, the absolute pressure in the various cylinders is atmospheric and the load on the control column 53 is zero.

As the airplane gains speed, the pressure in the inlet 111 which results from air speed, increases and produces, a moment about the fulcrum roller 133 with the piston 120 rising and the piston 119 compressing the air contained in the left side of the cylinder 96 and cylinder 99. It should be noted that when the air speed was zero, the position of the piston 95, and the fact that the valve 107 was closed to cylinder 99, caused the initial position of the piston 119 to be up while the piston 120 was down and the balancing arm 127 inclined as indicated in dotted lines in Figure 9. By proper selection of piston areas and of cylinder volumes it is possible to obtain a load on the piston 95 of the same magnitude with that obtained under the previously described conditions. Such a system then affords the pilot a control column load that varies consistently with air speed regardless of the fact that the valve 107 is open to cylinder 100 when climbing or cylinder 99 when diving.

Provision is made for obtaining a zero load on the feel system with any position of the controls. This is done by opening a by-pass valve 155, long enough to equalize the pressure on both sides of the piston 95. A new neutral position for the feel system is established every time the pressure is equalized by the by-pass valve 155. A spring 156 holds the valve 155 normally closed in order to obtain an adequate variation in the control column load with changes in air speed, and therefore with changes in the angle of attack.

While the atmospheric pressure is approximately 14.7 pounds per square inch at sea level under standard conditions, the increase in pressure caused by velocity of the airplane is too small to permit the desired load variation. For example, at 100 miles per hour the increase in pressure is of the order of only 1%. It is therefore necessary to multiply the dynamic pressure resulting from the velocity of the airplane.

Figure 9 shows apparatus for multiplying the dynamic pressure. A chamber 160 has one end opening, through the nose of the airplane, indicated by the reference character 162. The pressure of the air resulting from the velocity of the airplane pushes on a piston 165 located at a cylindrical end portion of the chamber 160 and transmits its pressure through a plunger 167, of substantially smaller diameter than the piston 165, to a hydraulic cylinder 170.

This hydraulic cylinder 170 has one end of substantially larger diameter and this larger end telescopes into another cylinder 172. The cylinder 170 is secured to a fixed portion of the airplane, but the cylinder 172 is movable and is connected with a piston 175 which telescopes into a cylinder 178 of substantially larger diameter than the cylinder 172. By the well known principle of the hydraulic press, slight variations in pressure in the chamber 160 are multiplied many times to produce a substantial increase in pressure in the cylinder 178 and in the inlet 111 through which air flows from the cylinder 178 to the valve 107.

Figure 9 is a diagrammatic illustration. In actual practice it is essential that there be no leakage of fluid from the feel system. The construction of the principal parts of the feel system, in order to avoid leakage is illustrated in Figures 12–14.

Figures 11, 14:
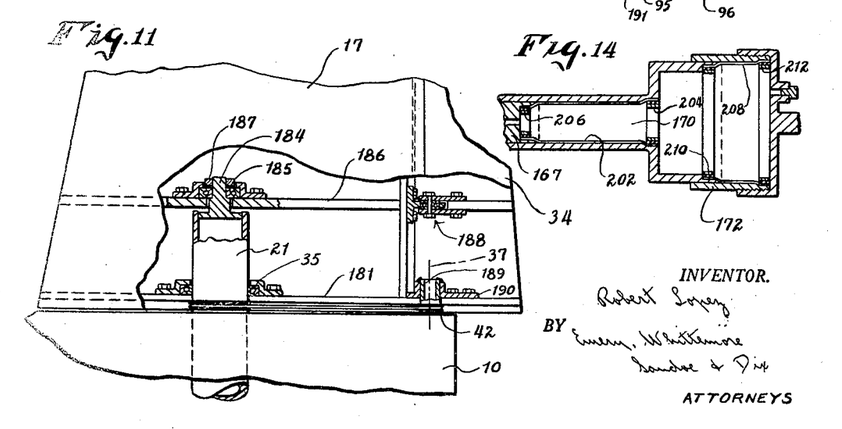
Figure 11 is a top plan view, partly broken away and in section, showing the connection of one of the flippers to the tip of the wing and showing the connection of the flap or elevon at the rearward end of the flipper.
Figure 14 is a sectional view of part of the operating mechanism which is shown diagrammatically in Figure 9.

Figure 11 shows the connection of the flipper 17 to the wing 10. The shaft 21 extends beyond the tip of the wing 10 and into the flipper 17. The shaft 21 extends through the ball bearing 35 which is attached to a strut 181 at the root end of the flipper 17. The outer end of the shaft 21 is of composite construction and has a reduced diameter end portion 184 which extends through a ball bearing 185 attached to a strut 186 at an intermediate station of the flipper 17.

A shoulder on the outer end portion of the shaft 21 and on one side of the ball bearing 85, and a collar 187 secured to the shaft 21 on the other side of the ball bearing 185 provide a construction which makes the bearing 185 serve as both a radial load and thrust bearing for the flipper 17.

The elevon 34 is connected to the forward portion of the flipper 17 by a hinge 188, the construction shown being a ball bearing hinge with one portion connected to the forward part of the flipper 17 and the other portion to a strut of the elevon 34.

The pulley 42 is attached to the elevon 34 by a sleeve 189 secured to a bracket 190 which is attached to a strut of the elevon 34.

Figures 12 and 13 show the cylinder 96 and a wrist pin 191 which extends through the piston 95 and which projects through opposite sides of the cylinder 96 through slots 192. The length of these slots depends upon the length of the stroke desired for the piston 95. The skirt of the piston 95, at both sides of the piston, is long enough so that at no time are the slots 192 uncovered by the piston. A thin tube 194 of elastic material, such as rubber, is fitted on the inside of the piston skirt on each side of the piston and the end portion of each of the thin tubes 194 is clamped against the inside face of the skirt of the piston 95 by a steel ring 197 held against the thin tube 194 by a pressure sleeve 199.

At the ends of the cylinder 96, the same construction is used for clamping the thin tube 194 against the inside face of the cylinder, and the thin tube 194 serves, therefore, as a membrane to prevent any escape of air from one side of the piston 95 to the other side during the operation of the apparatus. The piston skirt has its end shaped to provide a smooth edge that will slide under the thin tube 194 thus ensuring proper relative movement of the thin tube 194 as the piston 95 advances in the cylinder 96.

Figure 14 shows a similar construction for the apparatus by which the dynamic air pressure is multiplied. A thin flexible tube 202 is clamped against one end of the small diameter portion of the cylinder 170 by a clamping ring 204 and the other end of this flexible tube 202 is connected to the inside wall of a skirt on the end of the plunger 167. The clamping sleeve for securing the flexible tube 202 to the inside wall of the skirt of the plunger 167 is indicated by the reference character 206.

In similar manner the running clearance between the large end of the cylinder 170 and the telescoping cylinder 172 is sealed against leakage by a thin flexible tube 208. It is clamped against the inside wall of the large diameter end of the hydraulic cylinder 170 by a clamping ring 210; and is clamped against the inside wall of the telescoping cylinder 172 by a clamping ring 212. It will be understood that similar flexible tubes for sealing the fluid within the apparatus can be used in the other parts of the apparatus where pistons move within the cylinders.

Figure 15:
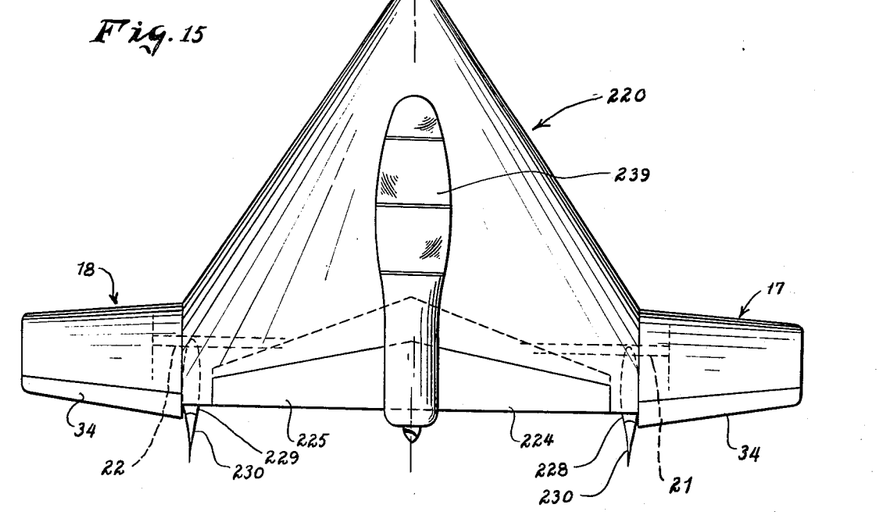
Figure 15 is a top plan view of a modified form of the invention with flippers applied to a Delta wing aircraft.
Figure 16:
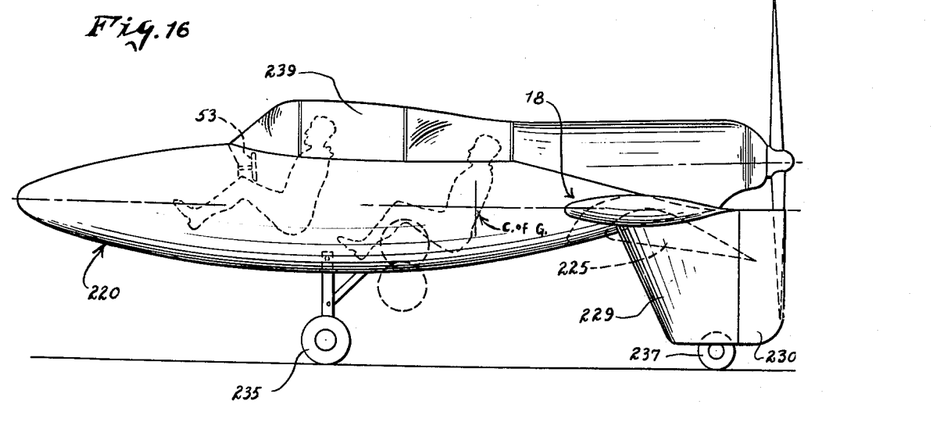
Figure 16 is an enlarged diagrammatic side elevation of the aircraft shown in Figure 15.

Figures 15 and 16 show a modified form of the invention in which the aircraft wings are constructed with the shape commonly referred to as a "Delta wing." This Delta wing, indicated by the reference character 220, has shafts 21 and 22 extending from the opposite wing tips as on the construction previously described; and there are flippers 17 and 18 pivotally connected to the wing 220 and operable in the same manner as the flippers 17 and 18 on the aircraft shown in Figure 3. As in the case of the other flippers, there are elevons or flaps 34 at the trailing edges of the flippers.

The Delta wing 220 is also provided with conventional flaps 224 and 225; and there are vertical control surfaces 228 and 229 extending downwardly from the wing 220. Each of these control surfaces 228 and 229 is provided with a rudder 230 operated by conventional operating mechanism.

The pivot connection of each of the flippers 17 and 18 to the tips of the wing 220 is located behind the aerodynamic center of the flipper and behind the center of gravity of the aircraft.

The aircraft shown in Figures 15 and 16 has a forward wheel 235 and has rearward wheels 237 in shrouds that form the control surfaces 228 and 229. The aircraft is controlled by a pilot seated in a cabin 239. The control of the flippers 17 and 18 is preferably the same as already described, and the control of the flaps 224 and 225, and other parts of the aircraft, conventional controls operated as in other airplanes.

What is claimed is:

1. An aircraft having a sweptback sustaining wing of airfoil section, flippers immediately beyond the wing tips, means connecting the flippers to the tip ends of the wing including bearings on which each of the flippers is angularly movable about an axis extending transversely of the intended line of flight of the aircraft, each of the flippers having free floating movement on said bearings and the axis of each of said bearings being located behind the aerodynamic center of the flipper, a control surface attached to each flipper, and movable angularly with respect thereto, and a connection between said control surface element and a part of the aircraft with respect to which the flipper moves, said connection being oriented to move the control surface element upon angular movement of the flipper with respect to the swing.

2. The aircraft described in claim 1 and in which the wing is a swept-back wing of substantially shorter chordwise extent at the wing tips, and in which the flippers are airfoil sections shaped to form approximate extensions of the wing when in neutral positions and the axis about which each of the flippers has angular movement extends at substantially right angles to the intended line of flight, and the flipper is freely movable on the bearings whereby its angle of attack is substantially independent of the angle of attack of the main wing under various operating conditions.

3. The aircraft described in claim 1 and in which each flipper is free to rotate on said bearings and the control surface element of each flipper is a spanwise extending flap hinged to the rearward end of the other portion of the flipper.

4. The aircraft described in claim 3 and in which the flipper is free to rotate on said bearings but the control surface element of the flipper is connected with pilot-operated means for moving the control surface element of the flipper.

5. The aircraft described in claim 1 and in which the wing has a swept-back leading edge and is of substantially shorter chordwise extent at the wing tips, and in which the flippers are airfoil sections shaped to form approximate extensions of the wing with their root ends of substantially the same chordwise extent as the tips of the wing, the said bearing means having its axis of rotation at substantially right angles with the intended direction of the flight of the aircraft and being formed in part by a shaft extending at opposite ends into the wing and the flipper, the flipper being free to rotate about the axis of the shaft, and the control surface element of the flipper being a spanwise extending flap at the trailing edge of the flipper.

6. The aircraft described in claim 5 and in which the shaft extends from the wing, and in which the flipper flap is operatively connected with the shaft and is operated by rotation of the shaft, and there are pilot-operated means for operatively controlling the surface element of the flipper including means for rotating the shaft with respect to the wing.

7. The aircraft described in claim 5 but in which the bearing on which the flipper moves includes thrust and radial load bearings in the flipper and through which the shaft extends, and the shaft is rotatable by pilot-operated means, and the flipper flap is operatively connected with the shaft whereby it is raised and depressed by rotation of the shaft.

8. An aircraft having a sweptback wing of airfoil section, flippers of airfoil section located immediately beyond the wing tips, means connecting the flippers to the wings, including a shaft extending beyond each wing tip and about which the flipper at each wing tip is angularly movable about an axis extending transversely of the intended line of flight of the aircraft, the axis being located rearward of the aerodynamic center of the flipper, and the flipper being freely floating on said shaft, a control surface element connected with each flipper, and a connection between the shaft and the control surface element, the connection being oriented to cause movement of the control surface element in the same direction as that of the flipper as the flipper swings freely on said shaft.

9. The aircraft described in claim 8 and in which there is a pulley connected to the control surface element of the flipper for movement as a unit therewith, another pulley secured to the shaft, and an endless belt extending around both of the pulleys and crossed so that the control surface element of the flipper moves in the same direction as that of the flipper as said flipper swings freely about said shaft.

10. The aircraft described in claim 8 and in which the shaft extends through spanwise-spaced struts in the flipper and there are radial load bearings surrounding the shaft at the respective struts providing angular movement of the flipper about the axis of the shaft, and thrust bearings on the shaft associated with a strut of the flipper for restraining axial movement of the flipper with respect to the shaft.

11. The aircraft described in claim 10 and in which the shaft is rotatable with respect to the wing and there is a similar shaft for connecting the flipper at the other wing tip, and the shafts are rotatable about their axes and with respect to the wing, and there are pilot-actuated connections by which both of the shafts are rotatable simultaneously in the same direction and selectively rotatable simultaneously in opposite directions, and connections by which the rotation of each shaft operates the control surface element of the flipper carried by that shaft to control the motion of the aircraft.

12. An aircraft having a wing of airfoil section and having flippers of airfoil section immediately beyond the wing tips in a spanwise direction, means connecting the flippers with the wing including bearings on which the flippers are rotatable and freely floating about axes extending transversely of the intended line of flight of the aircraft, said axes being located behind the aerodynamic centers of the flippers, said bearings including a shaft extending from each end of the wing through bearings in the flipper at that end of the wing, a control surface element attached to each flipper for angular movement, with respect to the flipper, about an axis, and means for causing relative movement of the control surface element about its axis in response to angular movement of the flipper about the shaft, including a device connected with the flipper control surface element and at least a portion of which extends beyond an axis about which the flipper control surface element moves angularly with respect to the flipper, another device attached to the shaft and having at least a portion beyond the axis of the shaft about which the flipper swings, and means connecting the devices and oriented so as to cause the flipper control surface element to swing about its axis in the same direction as that in which the flipper swings about the shaft.

13. An aircraft having a wing of airfoil section, flippers located immediately beyond the wing tips in a spanwise direction, means connecting the flippers to the wing including shafts extending from the wing tips and into the flippers in a direction transverse of the intended line of flight of the aircraft, bearing means on which the flippers have freely floating angular movement about the longitudinal axes of the shafts, said axes being located behind the aerodynamic centers of the flippers, a control surface element on each flipper including a flap extending spanwise and hinged to the rearward end of the flipper, motion-transmitting means through which the control surface element of each flipper is operated by rotation of the shaft of that flipper, and pilot-operated means for turning the shafts including irreversible gearing connections which are rotated by the pilot to turn the shafts.

14. The aircraft described in claim 13 and in which there is a fluid pressure-operated resistance system connected to the pilot-operated controls for compensating for the irreversible gearing through which no feel of the load can be transmitted to the pilot.

15. The aircraft described in claim 14 and in which the aircraft includes apparatus to supply pressure which varies with the air speed and which determines resistance of said fluid pressure-operated resistance system.

References Cited in the file of this patent

UNITED STATES PATENTS

| | | |
|---|---|---|
| 2,369,832 | Klose | Feb. 20, 1945 |
| 2,379,977 | Martin | July 10, 1945 |
| 2,406,588 | Cornelius | Aug. 27, 1946 |
| 2,563,757 | Thorp | Aug. 7, 1951 |
| 2,673,049 | Talbot | Mar. 23, 1954 |
| 2,684,215 | Ashkenas | July 20, 1954 |

FOREIGN PATENTS

| | | |
|---|---|---|
| 66,783 | Sweden | Aug. 21, 1920 |